United States Patent
Byun et al.

(10) Patent No.: US 9,287,548 B2
(45) Date of Patent: Mar. 15, 2016

(54) TERMINAL UNIT FOR SECONDARY BATTERY AND METHOD OF MANUFACTURING THE SAME

(75) Inventors: Sang-Won Byun, Suwon-si (KR); Sung-Bae Kim, Suwon-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 724 days.

(21) Appl. No.: 12/801,328

(22) Filed: Jun. 3, 2010

(65) Prior Publication Data

US 2011/0104566 A1 May 5, 2011

(30) Foreign Application Priority Data

Oct. 30, 2009 (KR) .......................... 10-2009-0104306

(51) Int. Cl.
*H01M 2/30* (2006.01)
*B23K 20/12* (2006.01)
*B23K 26/20* (2014.01)

(52) U.S. Cl.
CPC ............... *H01M 2/30* (2013.01); *B23K 20/122* (2013.01); *B23K 26/20* (2013.01); *B23K 2201/38* (2013.01)

(58) Field of Classification Search
CPC ....... H01M 2/30; B23K 26/20; B23K 20/122; B23K 2201/38
USPC ............. 429/61, 62, 122, 161, 176, 181, 183, 429/209, 211
See application file for complete search history.

(56) References Cited

U.S. PATENT DOCUMENTS

| | | | | |
|---|---|---|---|---|
| 3,477,115 A * | 11/1969 | Martin et al. | ............... | 228/114.5 |
| 6,156,452 A | 12/2000 | Kozuki et al. | | |
| 6,633,091 B1 * | 10/2003 | Anzawa | ........................... | 307/52 |
| 2002/0125297 A1 * | 9/2002 | Stol et al. | .................... | 228/112.1 |
| 2002/0150817 A1 * | 10/2002 | Grubb et al. | ................. | 429/178 |
| 2003/0215702 A1 * | 11/2003 | Tanjou et al. | ................. | 429/127 |
| 2006/0051664 A1 * | 3/2006 | Tasai et al. | .................... | 429/161 |
| 2007/0059592 A1 * | 3/2007 | Takami et al. | ................ | 429/161 |
| 2008/0029581 A1 * | 2/2008 | Kumagai et al. | ............. | 228/101 |
| 2009/0004559 A1 * | 1/2009 | Gardner et al. | ................ | 429/163 |
| 2011/0159353 A1 * | 6/2011 | Byun et al. | .................... | 429/160 |

FOREIGN PATENT DOCUMENTS

| | | | | |
|---|---|---|---|---|
| JP | 48-044789 A | | 6/1973 | |
| JP | 2004-014173 | * | 1/2004 | ............. H01M 2/30 |
| JP | 2004-106059 | * | 4/2004 | ............. B23K 20/00 |
| JP | 2006313818 | * | 11/2006 | ............. H01G 9/008 |
| KR | 10 2000-006887 A | | 11/2000 | |

OTHER PUBLICATIONS

Instytut Spawalnictwa printed Mar. 2, 2012 {http://www.is.gliwice.pl/en/download/technologie_spawalnicze_en.pdf}.*
Littvek et al Processes of Joining Materials C 2001-2008 {http://materialteknologi.hig.no/lettvektdesign.htm} (publication date taken as Dec. 2001 per p. 1 copyright date}.*
Ullmanns Encyclopeida of Industrial Chemistry—Welding and Cutting—Published On-line Jun. 15, 2000 vol. 39 pp. 395-420.*
Jaycar (online Sep. 7, 2007, per Wayback Machine date {http://www.jaycar.com/images_uploaded/battglos.pdf}).*
Korean Notice of Allowance in KR 10-2009-0104306, dated Oct. 31, 2011 (Byun, et al.).

* cited by examiner

*Primary Examiner* — Patrick Ryan
*Assistant Examiner* — Aaron Greso
(74) *Attorney, Agent, or Firm* — Lee & Morse, P.C.

(57) ABSTRACT

A terminal unit of a secondary battery and a method of manufacturing the same, the terminal unit including an electrode rivet, the electrode rivet being connected to an electrode assembly; a rivet terminal, the rivet terminal including a metal different from a metal of the electrode rivet; and a medium plate, the medium plate including a same metal as the electrode rivet, and being disposed between the electrode rivet and the rivet terminal so as to be overlap-weldable to the rivet terminal.

9 Claims, 3 Drawing Sheets

TERMINAL UNIT FOR SECONDARY BATTERY AND METHOD OF MANUFACTURING THE SAME

BACKGROUND

1. Field

Embodiments relate to a terminal unit for a secondary battery and a method of manufacturing the same.

2. Description of the Related Art

Secondary batteries are rechargeable batteries widely used in portable electronic devices, e.g., mobile phones, notebook computers, and camcorders. A secondary battery may include a case having an open portion, an electrode assembly accommodated in the case and including a positive electrode, a negative electrode, and a separator wound in a jelly-roll shape, and a cap assembly covering the open portion of the case. In addition, a current collecting plate may be disposed on an end of the electrode assembly. The current collecting plate may be electrically connected to a terminal arranged in the cap assembly. Thus, when the terminal of the cap assembly is connected to an external terminal, a current generated in the electrode assembly may be supplied to the external terminal via the current collecting plate and the terminal of the cap assembly.

The terminal unit may include a positive electrode rivet and a negative electrode rivet, which may be connected to the current collecting plate, and rivet terminals coupled to respective positive and negative-electrode rivets to be connected to bus bars. Coupling between the positive or negative electrode rivet and the rivet terminal and between the rivet terminal and the bus bar may be performed by laser welding. However, the positive electrode rivet and the negative electrode rivet may generally be formed of different metals. Thus, if the rivet terminal is formed of a different material from the materials of the positive electrode rivet and/or negative electrode rivet, heterogeneous metal welding may be performed between the electrode rivet and the rivet terminal, resulting in poor weldability.

SUMMARY

Embodiments are directed to a terminal unit for a secondary battery and a method of manufacturing the same, which represent advances over the related art.

It is a feature of an embodiment to provide a terminal unit for a secondary battery that ensures strong coupling even when welding between heterogeneous metals, and a method of manufacturing the same.

At least one of the above and other features and advantages may be realized by providing a terminal unit of a secondary battery including an electrode rivet, the electrode rivet being connected to an electrode assembly, a rivet terminal, the rivet terminal including a metal different from a metal of the electrode rivet, and a medium plate, the medium plate including a same metal as the electrode rivet, and being disposed between the electrode rivet and the rivet terminal so as to be overlap-weldable to the rivet terminal.

The rivet terminal and the medium plate may be overlap-welded by friction stir welding.

An end of the electrode rivet may be riveted over the medium plate.

The electrode rivet and the medium plate may be coupled to each other by laser welding.

The electrode rivet and the medium plate may include copper and the rivet terminal may include aluminum.

At least one of the above and other features and advantages may also be realized by providing a method of manufacturing a terminal unit of a secondary battery, the method including preparing an electrode rivet such that the electrode rivet is connected to an electrode assembly, preparing a rivet terminal such that the rivet terminal includes a metal different from a metal of the electrode rivet, preparing a medium plate such that the medium plate includes the same metal as the metal of the electrode rivet, disposing the medium plate between the electrode rivet and the rivet terminal such that a portion of the medium plate overlaps a portion of the electrode rivet, and welding the overlapped portions of the medium plate and the rivet terminal by friction stir welding.

The method may further include riveting an end of the electrode rivet over the medium plate.

The method may further include welding the electrode rivet and the medium plate by laser welding after riveting the end of the electrode rivet over the medium plate.

The electrode rivet and the medium plate may include copper and the rivet terminal may include aluminum.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
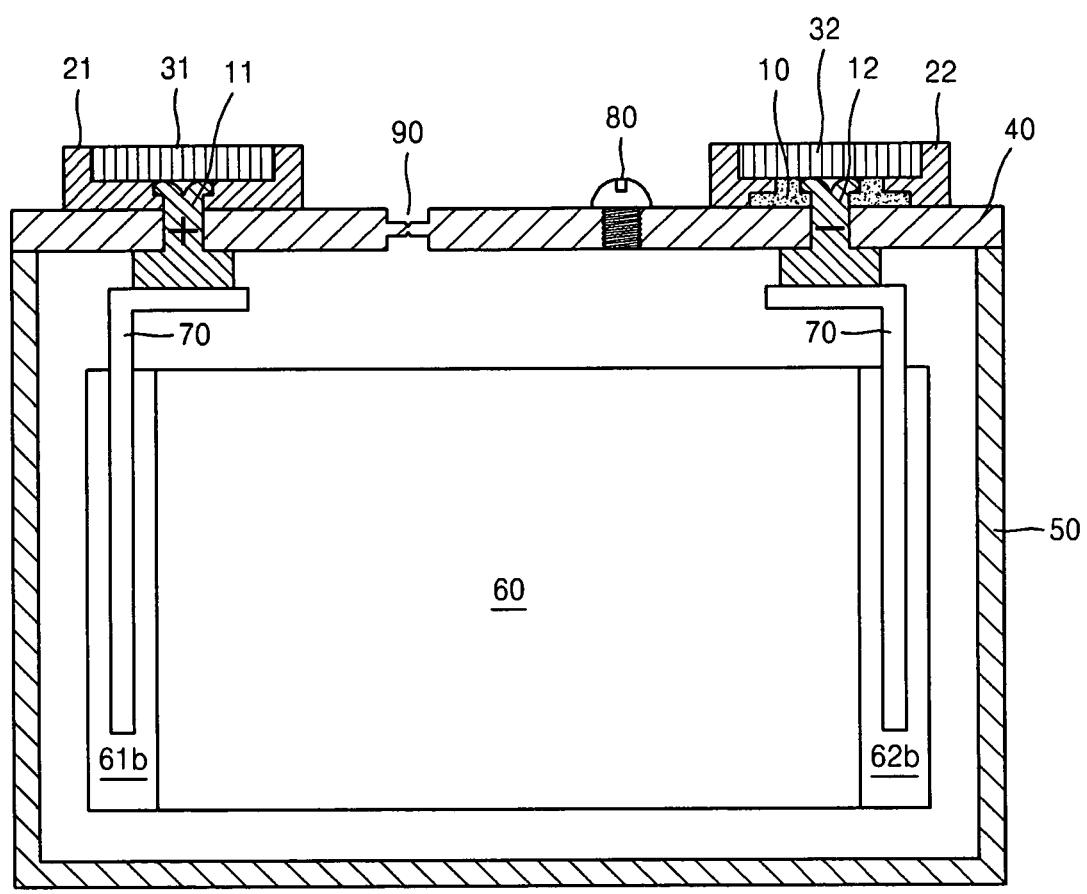
FIG. 1 illustrates a sectional view of a secondary battery according to an embodiment.

Korean Patent Application No. 10-2009-0104306, filed on Oct. 30, 2009, in the Korean Intellectual Property Office, and entitled: "Terminal Unit for Secondary Battery and Method of Manufacturing the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

FIG. 1 illustrates a sectional view of a secondary battery according to an embodiment. Referring to FIG. 1, the secondary battery may include an electrode assembly 60, current collecting plates 70 attached to respective ends of the electrode assembly 60, a case 50 accommodating the electrode assembly 60 and the current collecting plates 70, and a cap assembly 40 covering an open portion of the case 50. The electrode assembly 60 may include a positive electrode, a negative electrode, and a separator wound in a jelly-roll shape. The electrode assembly 60 with the current collecting plates 70 attached thereto may be placed in the case 50 through the open portion of the case 50. The open portion of the case 50 may be covered by the cap assembly 40 to prepare a cell that stably accommodates the electrode assembly 60.

A sealing material 80 may seal an inlet of the secondary battery after an electrolytic solution is injected into the case 50. A safety vent 90 may break when a pressure in the case 50 exceeds a predetermined pressure to allow a gas in the case 50 to be exhausted.

Figure 2:
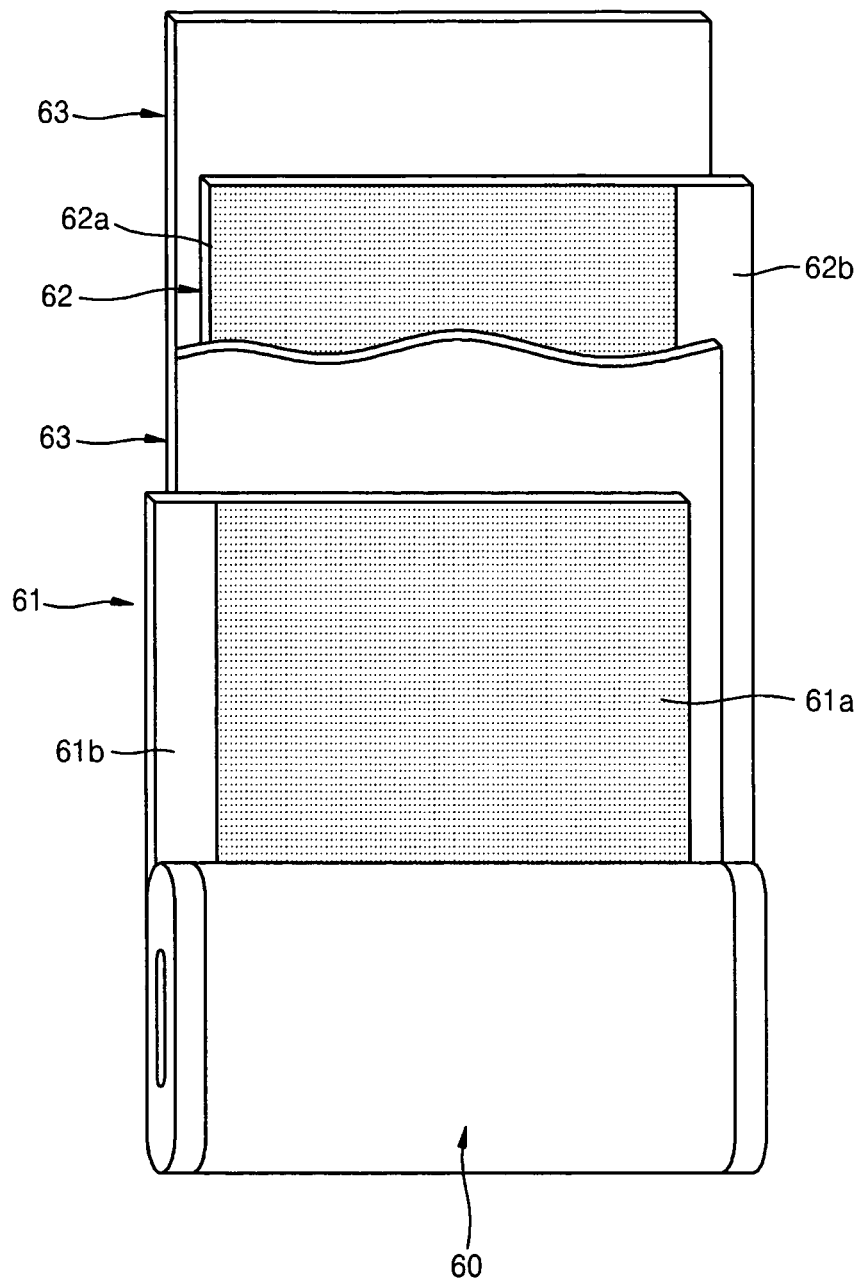
FIG. 2 illustrates a diagram of a structure of an electrode assembly of FIG. 1, according to an embodiment.

FIG. 2 illustrates a diagram of a structure of the electrode assembly 60 of FIG. 1. Referring to FIG. 2, the electrode assembly 60 may have a structure in which a positive electrode 61, a separator 63, and a negative electrode 62 are stacked alternately and wound in a jelly-roll shape. Portions of the positive electrode 61 may be coated with a positive electrode active material 61a and portions of the negative electrode 62 may be coated with a negative electrode active material 62a. In an implementation, the positive electrode 61 and the negative electrode 62 may respectively have non-coated portions 61b and 62b on ends thereof, wherein the non-coated portions 61b and 62b are not coated with the active material. The non-coated portion 61b of the positive electrode 61 and the non-coated portion 62b of the negative electrode 62 may be alternately arranged such that the electrode assembly 60 may have the non-coated portion 61b on an end thereof and may have the non-coated portion 62b on an opposing, other end thereof. In other words, the electrode assembly 60 may have the non-coated portion 61b of the positive electrode on a left side thereof and the non-coated portion 62b of the negative electrode 62 on a right side thereof. Thus, the current collecting plate 70 of FIG. 1 attached to a left side of the electrode assembly 60 may be electrically connected to the positive electrode 61 of the electrode assembly 60 and the current collecting plate 70 attached to a right side of the electrode assembly 60 may be electrically connected to the negative electrode 62 of the electrode assembly 60. The current collecting plates 70 may be respectively connected to a positive electrode rivet 11 of a terminal unit or a negative electrode rivet 12 of a terminal unit.

The terminal unit may include the positive electrode rivet 11 and negative electrode rivet 12, rivet terminals 21 and 22 respectively welded to the positive electrode and negative electrode rivets 11 and 12 and may include bus bars 31 and 32 respectively welded to the rivet terminals 21 and 22. The bus bar may connect, in parallel or series, a secondary battery adjacent to the secondary battery of an embodiment.

In the present embodiment, the negative electrode rivet 12 and the positive electrode rivet 11 may be formed of different materials from each other, e.g., copper and aluminum, respectively. In addition, the rivet terminals 21 and 22 and the bus bars 31 and 32 may be formed of, e.g., aluminum, like the positive electrode rivet 11. Thus, welding between the negative electrode rivet 12 and the rivet terminal 22 may be performed between heterogeneous, i.e., different, metals. In addition, welding between the positive electrode rivet 11 and the rivet terminal 21, welding between the rivet terminal 21 and the bus bar 31, and/or welding between the rivet terminal 22 and the bus bar 32 may be performed between homogenous, i.e., the same metals. Welding between homogenous metals may provide sufficient welding strength even when general laser welding is used, and thus, a commonly used method may be employed. However, if the welding between heterogeneous metals, i.e., the welding between the negative electrode rivet 12 and the rivet terminal 22, is performed using laser welding, welding strength therebetween may be weak.

Thus, the welding between the negative electrode rivet 12 and the rivet terminal 22 may be performed by friction stir welding using a medium plate 10 formed of the same material as that of the negative electrode rivet 12.

Friction stir welding is a welding process in which a welding tool provides friction heat to a welding portion. Since the friction stir welding may be performed at a relatively lower temperature than that the laser welding, a portion of the components being welded affected by heat may be small. In addition, two welding portions formed of heterogeneous metals may be uniformly mixed by friction stirring of the welding tool, thereby resulting in uniform and solid welding strength. When the friction stir welding is performed, two materials to be welded may be arranged to overlap. Thus, by using the medium plate 10 between the negative electrode rivet 12 and the rivet terminal 22, welding at overlapping portions may be performed between heterogeneous metals.

Figure 3A:
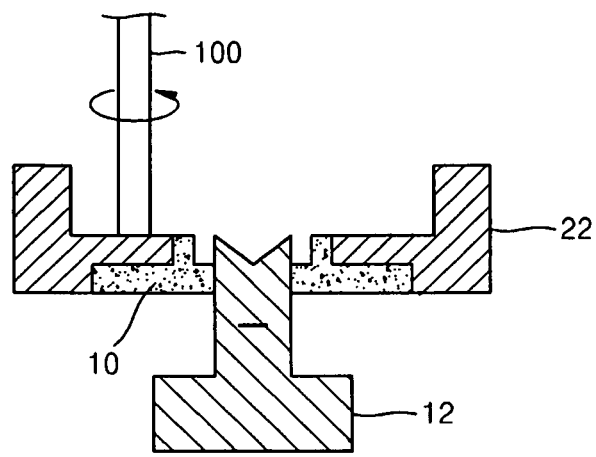
FIGS. 3A through 3C illustrate stages in a method of combining a negative electrode rivet and a rivet terminal of the secondary battery of FIG. 1, according to an embodiment.

FIG. 3A illustrates stages in a method of performing overlap welding between the medium plate 10 and the rivet terminal 22 by friction stir welding. Referring to FIG. 3A, a welding tool 100 may contact a region where the medium plate 10 and the rivet terminal 22 overlap. The welding tool 100 may be rotated to generate friction heat. Accordingly, the overlapping portions of the medium plate 10 and the rivet terminal 22 may be partially melted and mixed together to achieve strong and solid welding. In other words, the rivet terminal 22 formed of, e.g., aluminum, and the medium plate 10 formed of, e.g., copper, may have far stronger welding strength via friction stir welding than when, e.g., laser welding, is performed.

Figure 3B:
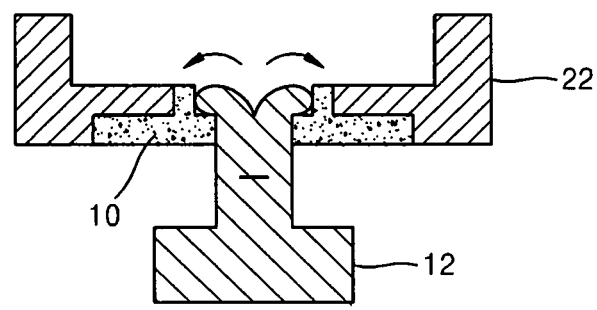

Referring to FIG. 3B, after welding the medium plate 10 and the rivet terminal 22, a top end of the negative electrode rivet 12 may be riveted over the medium plate 10. In contrast to the negative electrode rivet 12, a top end of the positive electrode rivet 11 may be riveted over the rivet terminal 22 with no medium plate 10 therebetween and laser welding may then be performed thereon due to, e.g., the homogenous composition of the positive electrode rivet 11 and the rivet terminal 22. In the present embodiment, a new structure may be introduced into the negative electrode rivet 12. In particular, upper portions of the negative electrode rivet 12 may be bent downward in order to attach the negative electrode rivet 12 to the medium plate. As a result, after the rivet process, the medium plate 10 may not become unattached from the negative electrode rivet 12.

Figure 3C:
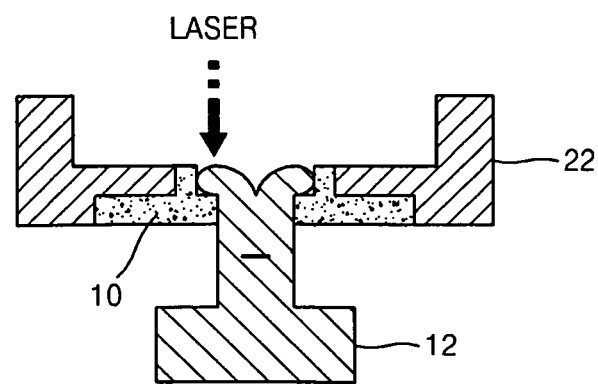

As illustrated in FIGS. 1, 3B, and 3C, the negative electrode rivet 12 is connected to the current collecting plate 70 at an interior side of the cap assembly 40 of the secondary battery and includes an end that extends through the cap assembly 40. The rivet terminal 22 and the medium plate are on an exterior surface of the cap assembly 40. A first portion of a surface of the medium plate 10 that faces away from the exterior surface of the cap assembly is overlapped by the rivet terminal 22 such that the first portion is between the rivet terminal 22 and the cap assembly 40. A second portion of a surface of the medium plate 10 that faces away from the exterior surface of the cap assembly is not overlapped by the rivet terminal 22 such that the second portion is not between the rivet terminal 22 and the cap assembly. The end of the negative electrode rivet 12 is riveted to the medium plate 10 at the second portion of the medium plate.

Referring to FIG. 3C, an interface between the negative electrode rivet 12 and the medium plate 10 may be welded using laser welding. In this regard, the negative electrode rivet 12 and the medium plate 10 may be formed of the same metal, e.g., copper, and thus a weld between the negative electrode rivet 12 and the medium plate 10 may have sufficient strength even when laser welding is used.

As the rivet terminals 21 and 22 and the bus bars 31 and 32 may be formed of the same material, e.g., aluminum, laser welding may be used in subsequent welding processes.

Therefore, when a terminal unit of a secondary battery is assembled using the method described above, strong and solid welding between heterogeneous metals may be achieved.

Although an example of performing heterogeneous metal welding on the negative electrode rivet and rivet terminal has been illustrated, heterogeneous metal welding may be performed on the positive electrode rivet and rivet terminal, if necessary. Thus, when heterogeneous metal welding between an electrode rivet and a rivet terminal is performed, a medium plate formed of the same material as that of the electrode rivet may overlap portions of the rivet terminal, and the electrode rivet and the rivet terminal may be coupled to each other by friction stir welding the medium plate to the rivet terminal. As a result, a solid and strong welding structure may be obtained.

In the terminal unit of an embodiment, coupling strength between the positive electrode rivet or the negative electrode rivet and the rivet terminal may be strong. When the rivet terminal is formed of the same material as that of the electrode rivet, weldability between the electrode rivet and the rivet terminal may be excellent. However, heterogeneous metal welding may still be required when the rivet terminal is coupled to the bus bar. Accordingly, the terminal unit and method of manufacturing the same according to an embodiment may prevent welding problems during welding between heterogeneous metals thereof.

According to an embodiment, excellent adhesion between an electrode rivet and a rivet terminal may be achieved by friction stir welding via an intervening medium plate. Thus, although two metals to be welded may be different from each other, strong and solid adhesion may be obtained.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A terminal unit of a secondary battery, comprising:
an electrode rivet, the electrode rivet being connected to an electrode assembly at an interior side of a cap assembly of the secondary battery, the electrode rivet including an end that extends through the cap assembly;
a rivet terminal on an exterior surface of the cap assembly, the rivet terminal being formed of a metal different from a metal of the electrode rivet; and
a medium plate on the exterior surface of the cap assembly, the medium plate:
being formed of a same metal as the electrode rivet and a metal different from the metal of the rivet terminal, and
being disposed between the electrode rivet and the rivet terminal, the medium plate including a first portion having a surface parallel with a plane of the cap assembly and facing away from the exterior surface of the cap assembly, the surface of the first portion being overlapped by the rivet terminal such that the first portion of the medium plate is between the rivet terminal and the cap assembly in a direction orthogonal to the plane of the cap assembly so as to be overlap-weldable to the rivet terminal, and a second portion having the surface facing away from the exterior surface of the cap assembly, the second portion not being overlapped by the rivet terminal, and the second portion not being between the rivet terminal and the cap assembly.

2. The terminal unit of a secondary battery as claimed in claim 1, wherein the rivet terminal and the medium plate are overlap-welded by friction stir welding.

3. The terminal unit of a secondary battery as claimed in claim 2, wherein the end of the electrode rivet is riveted to the medium plate at the second portion of the medium plate.

4. The terminal unit of a secondary battery as claimed in claim 3, wherein the electrode rivet and the medium plate are coupled to each other by laser welding.

5. The terminal unit of a secondary battery as claimed in claim 1, wherein the electrode rivet and the medium plate include copper and the rivet terminal includes aluminum.

6. A method of manufacturing a terminal unit of a secondary battery, the method comprising:
preparing an electrode rivet such that the electrode rivet is connected to an electrode assembly at an interior side of a cap assembly of the secondary battery, and such that an end of the electrode rivet extends through the cap assembly;
preparing a rivet terminal on an exterior surface of the cap assembly such that the rivet terminal is formed of a metal different from a metal of the electrode rivet;
preparing a medium plate on the exterior surface of the cap assembly such that the medium plate is formed of the same metal as the metal of the electrode rivet and a metal different from the metal of the rivet terminal;
disposing the medium plate between the electrode rivet and the rivet terminal such that a first portion of the medium plate having a surface parallel with a plane of the cap assembly and facing away from the exterior surface of the cap assembly that is overlapped by a portion of the rivet terminal such that the first portion of the medium plate is between the rivet terminal and the cap assembly in a direction orthogonal to the plane of the cap assembly and a second portion of the medium plate having a surface facing away from the exterior surface of the cap assembly that is not overlapped by the electrode rivet, the second portion not being between the rivet terminal and the cap assembly; and
welding the overlapped portions of the medium plate and the rivet terminal by friction stir welding.

7. The method as claimed in claim 6, further comprising riveting the end of the electrode rivet the medium plate at the second portion of the medium plate.

8. The method as claimed in claim 7, further comprising welding the electrode rivet and the medium plate by laser welding after riveting the end of the electrode rivet to the medium plate.

9. The method as claimed in claim 6, wherein the electrode rivet and the medium plate include copper and the rivet terminal includes aluminum.

* * * * *